(12) United States Patent
Honda

(10) Patent No.: US 6,983,458 B1
(45) Date of Patent: Jan. 3, 2006

(54) SYSTEM FOR OPTIMIZING DATA TYPE DEFINITION IN PROGRAM LANGUAGE PROCESSING, METHOD AND COMPUTER READABLE RECORDING MEDIUM THEREFOR

(75) Inventor: Kazushi Honda, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 403 days.

(21) Appl. No.: 09/605,884

(22) Filed: Jun. 29, 2000

(30) Foreign Application Priority Data

Jun. 29, 1999 (JP) .................................. 11-184252

(51) Int. Cl.
G06F 9/45 (2006.01)
(52) U.S. Cl. ...................... 717/151; 717/136; 717/137; 717/139; 717/140; 717/168; 719/316
(58) Field of Classification Search ........ 717/136–140, 717/143, 151, 154, 127, 131, 168; 719/316
See application file for complete search history.

(56) References Cited

U.S. PATENT DOCUMENTS

| | | | | |
|---|---|---|---|---|
| 5,175,856 | A * | 12/1992 | Van Dyke et al. ........... | 717/151 |
| 5,418,964 | A * | 5/1995 | Conner et al. .............. | 719/316 |
| 5,493,675 | A * | 2/1996 | Faiman et al. .............. | 717/151 |
| 5,613,117 | A * | 3/1997 | Davidson et al. ........... | 717/144 |
| 5,613,120 | A * | 3/1997 | Palay et al. .................. | 717/165 |
| 5,659,753 | A * | 8/1997 | Murphy et al. ............. | 717/147 |
| 5,764,989 | A * | 6/1998 | Gustafsson et al. ......... | 717/129 |
| 5,815,653 | A * | 9/1998 | You et al. ..................... | 714/38 |
| 5,836,014 | A * | 11/1998 | Faiman, Jr. ................. | 717/156 |
| 6,041,179 | A * | 3/2000 | Bacon et al. ............... | 717/116 |
| 6,182,281 | B1 * | 1/2001 | Nackman et al. ........... | 717/116 |
| 6,446,254 | B1 * | 9/2002 | Chapman et al. ........... | 717/116 |
| 6,829,759 | B1 * | 12/2004 | Davis et al. ................. | 717/140 |

OTHER PUBLICATIONS

Access 2000 for Windows for Dummies, by John Kaufeld, 1999, Hungry Minds.*
TITLE: Incremental compilation of locally optimized code, author: Pollock et al, ACM, 1984.*
TITLE: Compiling Functional language, author, Cardelli, ACM, 1984.*
Bjarne Stroustrup, "TEMPLATES", Addison-Wesley Publishing Company, The Design and Evolution of C++, Chapter 15, 1994, pp. 337-381.

* cited by examiner

*Primary Examiner*—Chameli C. Das
(74) *Attorney, Agent, or Firm*—Oblon, Spivak, McClelland, Maier & Neustadt, P.C.

(57) ABSTRACT

The present invention provides a code optimizing method for a program language processing system which can delete an unnecessary duplicate multiphase type definition and can avoid an unnecessary multiphase type from being instantiated. In this language processing system, all preprocessed source programs to be used as a source for generating an object program are scanned, a duplicate data type definition is deleted from the source programs with reference to a data type definition table, arranged for one object program, for registering a data type definition for data or a function in the source programs, instantiation of a data type definition which has been instantiated as needed is suppressed to optimize the source programs, and the optimized source programs are output in units of translation. Since a code size is reduced by the optimization, a code execution speed increases, and a compile time and a link time can be shortened.

14 Claims, 22 Drawing Sheets

FIG. 1
PRIOR ART

```
template<class T> struct vector {
    T* v;
    int size;
};
                    DEFINITION FOR
                    MULTIPHASE TYPE
...

void f( )
{
    vector<int> vi;
    vector<double> vd;
    ...
};
```

- 101 — (outer box around definition)
- 102 — T (class parameter)
- 103 — T* v;
- 104 — vector<int> vi;
- 105 — vector<double> vd;

FIG. 2
PRIOR ART

```
struct vector <int> {
    int* v;
    int size;
};
```
— 106

```
struct vector <double> {
    double* v;
    int size;
};
```
— 107

INSTANTIATED MULTIPHASE TYPE

FIG. 3

```
template<class T> T max (T a, T b)
{
    return a > b ? a : b;
}
```
— 108

```
template<class T> class Rex {
public;
    T size( ) { return sizeof (T) ;}
    . . .
};
```
— 109

```
template<class T> struct vector {
    T* v;
    int size;
};
```
sample.h

```
#include "sample.h"
...
void f()
{
    vector<int> vi;
    ...
}
...
```
310

```
struct vector_int {
    int* v;
    int size;
};
```
311

```
...
void f()
{
    vector_int vi;
    ...
}
...
```
312

FIG. 7A
DECLARATION FILE (HEADER FILE) FOR MULTIPHASE TYPE

Stack.h

```cpp
template<class T> class Stack {
    T* v;
    T* p;
    int size;
public:
    Stack(int);
    ~Stack( );
    void push(T);
    T pop( );
};
```

FIG. 7B
DEFINITION FILE FOR MULTIPHASE TYPE

313 —

Stack.cpp

```cpp
#include "stack.h"
template<class T> Stack<T>:: Stack(int s)
{
    v = p - new T[size - s];
}
template<class T> Stack<T>::~ Stack( )
{
    delete[ ] v;
}
template<class T> void Stack<T>::push(T a)
{
    *p++ = a;
}
template<class T> T Stack<T>P::pop( )
{
    return *--p;
}
```

FIG. 7C
SOURCE FILE USING MULTIPHASE TYPE

314 —
315 — file.cpp

```cpp
#include "stack.h"
void func( )
{
    Stack<int> s;
    ...
}
...
```

FIG. 8A  DECLARATION FILE FOR MULTIPHASE TYPE

Stack.h

```cpp
template<class T> class Stack {
    T* v;
    T* p;
    int size;
public:
    Stack(int);
    ~Stack( );
    void push(T);
    T pop( );
};
```

316

```cpp
template<class T> Stack<T>:: Stack(int s)
{
    v = p - new T[size - s];
}
template<class T> Stack<T>::~ Stack( )
{
    delete[ ] v;
}
template<class T> void Stack<T>::push(T a)
{
    *p++ = a;
}
  template<class T> T Stack<T>::pop( )
{
    return *--p;
}
```

FIG. 8B  SOURCE FILE USING MULTIPHASE TYPE

317 — `#include"stack.h"`

```cpp
void func( )
{
```

318 — `Stack<int> s;`

```
    ...
}
...
``` file.cpp

FIG. 9A  DECLARATION FILE (HEADER FILE) FOR MULTIPHASE TYPE

Stack.h

```
template<class T> class Stack {
    T* v;
    T* p;
    int size;
public:
    Stack(int);
    ~Stack( );
    void push(T);
    T pop( );
};
```

FIG. 9B  DEFINITION FILE FOR MULTIPHASE TYPE

319

Stack.cpp

```
#include"stack.h"
template<class T> Stack<T>:: Stack(int s)
{
    v = p - new T[size - s];
}
template<class T> Stack<T>::-Stack( )
{
    delete[ ] v;
}
template<class T> void Stack<T>::push(T a)
{
    *p++ = a;
}
template<class T> T Stack<T>P::pop( )
{
    return *--p;
}
```

FIG. 9C  SOURCE FILE USING MULTIPHASE TYPE

318 file.cpp

```
#include"stack.h"
void func( )
{
    Stack<int> s;
    ...
}
...
```

FIG. 10

```
template<class T> class Stream {
pubic;

T & add_info(T&);

void add_list (T&, int);

void add_cell (T&);

void add_alist (T&, int);

. . .

};
```

321 — (points to inner box containing the method declarations)

```
            template<class T>  T max(T a,T b)
a.h —       {
                return a > b ? a : b;
            }
```

*FIG. 11A*

```
            #include "a.h"

f1.cpp —    void func 1 ( )
            {
               . . .
322 —          i=max<int> (1, 3);
               . . .
            } void func 2 ( )
            {
               . . .
323 —          j=max<int> (4, 3);
               . . .
            }
```

*FIG. 11B*

```
            #include"a.h"
            void func 3 ( )
            {
               . . .
324 —          k=max<int>(1, 10);
f2.cpp —       . . .
            }
```

*FIG. 11C*

FIG. 16A
PREPROCESSED SOURCE PROGRAM

```
template<class T> class Tree {
    T e;
    Tree<T> *lc, *rc;
public:
    Tree (T);
    ~Tree ();
    void insert (T);
};
...
void func( )
{
    Tree<int> t;
    Tree<double> s;
    Tree<double> u;
    ...
}
```

42

45 — Tree<int> t;
46 — Tree<double> s;
47 — Tree<double> u;

FIG. 16B
OPTIMIZED SOURCE PROGRAM

```
class Tree_int {
    int e;
    Tree_int *lc, *rc;
public:
    Tree_int (int);
    ~Tree_int ();
    void insert (int);
};

class Tree_double {
    double e;
    Tree_double *lc, *rc;
public:
    Tree_double(double);
    ~Tree_double ();
    void insert (double);
};
...
void func( )
{
    Tree_int t;
    Tree_double s;
    Tree_double u;
    ...
}
```

42, f0'
44

48 — Tree_int t;
49 — Tree_double s;
50 — Tree_double u;

FIG. 17A

```
template<class T> T max (T a, T b)
{
    return a > b ? a : b;
} void func1()
{
    ...
    i = max<int> (1,3);
    ...
} void func2()
{
    ...
    j = max<double> (4.2,3.3);
    ...
}
```
(f1)

```
void func3()
{
    ...
    k = max<int> (1,10);
    ...
}
```
(f2)

FIG. 17B

MULTIPHASE TYPE DEFINITION TABLE
(FUNCTION USAGE INFORMATION)

| SYMBOL | USAGE FLAG |
|---|---|
| max<int> | USED |
| max<double> | USED |
| max<char> | UNUSED |

FIG. 18A

```
template<class T> T max (T a, T b)     — 51
{
    return a > b ? a : b;
}
                                        f1 void func1 ( )
{
    ...
    i = max<int> (1,3);                 — 53
    ...
}
void func2 ( )
{
    ...
    j = max<double> (4.2,3.3);          — 54
    ...
}
```

FIG. 18B

```
                                        f2
void func3( )
{
    ...
    k=max<int>(1,10);                   — 55
    ...
}
```

FIG. 18C

```
int max_int (int a, int b)              — 62
{
    return a > b ? a : b;
}
double max_double (double a, double b)  — 63
{
    return a > b ? a : b;
}
                                        f1'
void func1 ( )
{
    ...
    i = max_int (1,3);                  — 64
    ...
}
void func2 ( )
{
    ...
    j = max_double (4.2,3.3);           — 65
    ...
} f2'
void func3 ( )
{
    ...
    k = max_int (1,10);                 — 66
    ...
}
```

FIG. 19A

PREPROCESSED SOURCE PROGRAM — 66

```
template<class T> class Stream {
public:
    T& add_info(T&);           — f3
    void add_list(T&,int);
    void add_cell(T&);
    void add_alist(T&,int);
    ...
}                              — 67
...
void func2()
{
    stream<int> s;
    stream<double> t;
    ...
    s.add_list( s.add_info(s) , 3);   — 69
}                              — 68
```

FIG. 19B

MULTIPHASE TYPE DEFINITION TABLE (MEMBER FUNCTION INFORMATION)

| SYMBOL | USAGE FLAG |
|---|---|
| Stream<int>::add_info — 70 | USED — 72 |
| Stream<int>::add_list — 71 | USED |
| Stream<int>::add_cell | UNUSED |
| Stream<int>::add_alist | UNUSED |
| ... | ... |
| Stream<double>::add_info | UNUSED |
| Stream<double>::add_list | UNUSED |
| Stream<double>::add_cell | UNUSED |
| Stream<double>::add_alist | USED |

FIG. 21A

PREPROCESSED SOURCE FILE

```
template<class T> class Stream {        — 66
public;
    T & add_info(T &);                   — 79
    void add_list(T &,int);              — 74
    void add_cell(T &);                  — 75
    void add_alist(T &,int);             — 80
}
...

void func 2 ( )
{
    stream<int> s;                       — 76
    stream<double> t;                    — 77
    ...
    s.add_list (s.add_info(s) , 3);      — f3
}
```

FIG. 21B

OPTIMIZED SOURCE PROGRAM — 78

```
class Stream_int  {
public ;
    int add_info(int&);
    void add_list(int&,int);
} class Stream_double {
public ;
    void add_alist(double&,int);         — 81
}
...

void func 2 ( )
{
    stream_int s;
    stream_double t;
    ...
    s.add_list (s.add_info(s) , 3);      — f3'
}
```

FIG. 21C

MULTIPHASE TYPE DEFINITION TABLE
(MEMBER FUNCTION INFORMATION)

| SYMBOL | USAGE FLAG |
|---|---|
| Stream<int>::add_info | USED |
| Stream<int>::add_list | USED |
| Stream<int>::add_cell | UNUSED |
| Stream<int>::add_alist | UNUSED |
| Stream<int>::add_info | UNUSED |
| Stream<int>::add_list | UNUSED |
| Stream<int>::add_cell | UNUSED |
| Stream<int>::add_alist | USED |

SYSTEM FOR OPTIMIZING DATA TYPE DEFINITION IN PROGRAM LANGUAGE PROCESSING, METHOD AND COMPUTER READABLE RECORDING MEDIUM THEREFOR

BACKGROUND OF THE INVENTION

1. Field of the Invention

The present invention relates to a system for optimizing a multiphase type definition in program language processing, a method therefor, and a computer readable recording medium. In particular, the present invention relates to a technique for easily deleting duplication of, e.g., a data type definition for data, a function, or the like of a multiphase type or the like and for avoiding unnecessary data, an unnecessary function, or the like from being instantiated so as to realize generation of an efficient code in a program language processing system for generating an object program from a source program.

2. Background Art

Data handled in a programming language are classified in various data types depending on the available values of the data, the types of operations, and the like. For example, in addition to a basic data type such as an integer type, a real number type, a single-precision type, and a double-precision type, a type using a structure constituted by the same types or different types as a unit is known.

In this manner, many programming languages introduce the concepts of data types of data or functions. Of these types, a multiphase type which can apply an algorithm expressed by making a data type a parameter to data or functions of various types has attracted attention. This multiphase type represents the group of a type. The multiphase type is to define a type which does not depend on an individual type such as an integer type or a real number type by introducing a type variable having a type as a parameter, and makes it possible to realize an efficient programming.

FIG. 1 is a diagram showing a conventional definition for a multiphase type and a usage method thereof, and FIG. 2 is a diagram showing a conventional definition for a instantiated multiphase type.

A definition 101 illustrated in FIG. 1 is a definition for a multiphase type. "T" indicated by 102 denotes declaration of a type variable using a type as a parameter, and "T*" indicated by 103 denotes an actual type variable. When an appropriate type is applied as the type variable by the definition 101 of the multiphase type, an actual definition (instantiated definition) corresponding to each type is generated.

For example, 104 and 105 shown in FIG. 1 requests generation of definitions corresponding to an int type (integer type) and a double type (double-precision type) of multiphase vectors. The instances of definitions indicated by 106 and 107 in FIG. 2 are generated in a language processing system (to be described later). It is called instantiation of data type definition that a definition for a multiphase type is developed and generated by the language processing system to be used as an actual definition.

FIG. 3 is a diagram showing a definition for a multiphase type function in a conventional technique.

A definition indicated by 108 in FIG. 3 defines a multiphase type function. The multiphase type function means a function which does not depend on an individual type.

On the other hand, when an abstract data type is applied to a multiphase type, a function handling data of the abstract data type is particularly called a multiphase type member function. A definition indicated by 109 in FIG. 3 defines a multiphase type member function.

FIG. 4 is a block diagram showing the configuration of a program language processing system in a conventional technique, and FIG. 5 is a concept diagram showing the flow of processes in the program language processing system in a conventional technique.

The conventional program language processing system is comprised by a software driver 201, a preprocessor 203, a language processor 204, and a linker 205 as shown in FIG. 4 to generate an object program from a source program.

The software driver 201 receives a source program group 202 and performs control to sequentially give the source program group to the preprocessor 203, the language processor 204, and linker 205, thereby obtaining an object program as an output file.

More specifically, as shown in FIG. 5, when the source programs 202 are given to the corresponding preprocessors 203, respectively, preprocessing such as translation is executed, and preprocessed programs 207 each having a format which can be interpreted by the language processor 204 of the following stage are obtained. The language processor 204 compiles the preprocessed programs 207, respectively, and outputs relocatable objects 208 to the linker 205 as files. The linker 205 links the input relocatable object files, thereby obtaining an object program 206.

In this program language processing system, when data or the like of a multiphase type is used, the instance of a definition for the multiphase type is generated and developed to realize the routine of the multiphase type.

For example, in a multiphase type shown in FIG. 6, data and inline codes of the multiphase type are requested in units of translation. For this reason, when a multiphase type 310 is used, an instance 311 of a definition for a multiphase type is automatically inserted in units of translation, and a multiphase type name is converted into a unique character string generated according to an appropriate rule as indicated by 312 in FIG. 6, so that a instantiated definition for an int type is realized by a definition for a multiphase type in FIG. 6.

However, in the conventional program language processing system, the following problems are mainly posed when an instance of a definition for multiphase type function or data is generated.

(1) Problem Posed when Definition for Multiphase Type Function

In case of a multiphase type function, when generation of the instance of a definition is requested, it is very difficult that a definition for a function which must generate the instance is detected by the language processing system. More specifically, in case of a standard file configuration having a declaration file (header file) "stack k.h" for the multiphase type, a definition file "stack.cpp" for the multiphase type, a source file using a multiphase type "file.cpp" is captured by an include directive 313 and 314.

However, in the conventional language processing system, since a definition for a multiphase type function cannot be detected, a definition for a multiphase type member function existing in the file "stack.cpp" (shown in FIG. 7B) is not captured by the file "file.cpp".

Here, a request of instantiation of a definition for a multiphase type is generated by a declaration 315. However, definitions for multiphase type member functions do not exist in units of translation in the file "file.cpp". For this reason, although the language processing system tries to generate the instance of the definition for the multiphase type member function, since this definition exists in the other file "stack.cpp", the instance of the definition for the multiphase type member function cannot be generated.

Therefore, in the conventional technique, in order to search for a definition for a multiphase type function, (a) it is requested to place a definition for a multiphase type function in a header file, or (b) the naming rule of a file in which a definition for a multiphase type function is placed is limited.

In the countermeasure against the problem (a), as illustrated in FIG. 8A, not only the declaration of the multiphase type function, but also all definitions indicated by 316 are requested to be described in the header file "stack.h". Therefore, it is requested in 318 to instantiate a multiphase type function existing in a source file "file.cpp" (shown in FIG. 8B), if the header file is included as indicated by 317, the language processing system can detect definitions for the multiphase type functions in units of translation. However, in case of (a), since re-compiling must be required to change a definition for a multiphase type function, the file configuration has low flexibility.

In the countermeasure in the problem (b), for enabling the language processing system to detect a definition for a multiphase type function, it is requested that the name of a file in which the definition for the multiphase type function must be a name (in many cases, the same name as that of the phase type) determined according to a certain rule.

For example, as shown in FIG. 9A, a definition for a multiphase type member function "Stack" placed in a header file "stack.h" requests a source programmer to place the definition in the same source file name "Stack.cpp" (shown in FIG. 9B) as the multiphase type name "Stack". In this manner, when it is requested by a declaration 318 to generate the instance of a definition "Stack : : Stack" for a multiphase type function indicated by 319, the language processing system searches a file "Stack.cpp" of a predetermined name for a definition for a member function to make it possible to generate of the instance of the definition for the multiphase type function. However, in case of the problem (b), a plurality of definitions for a multiphase type cannot be described in a header file, files of limited names the number of which is equal to the number of multiphase type must be formed, the source programmer is requested to perform an unnecessary job.

(2) Problem Posed when Instance of Definition for Unnecessary Multiphase Type Member Function In case of a multiphase type member function, generation of the instance of a member function which is not used increases a compile time, and excessively uses a memory region. More specifically, in case of a definition for a multiphase type illustrated in FIG. 10, when the number of multiphase type member functions indicated by 321 is 100, and the number of actually used multiphase type member functions is only one, it is apparently understood that generation of the instances of the definitions for the 99 remaining multiphase type member functions is not efficient.

Therefore, a conventional technique copes with the problem as follows. That is, the instances of the definitions for all the multiphase type member functions are generated regardless of efficiency, or generation of the instances of the definitions for the multiphase type member functions is delayed until all used multiphase type member functions are proved. The instances of the member functions are inefficiently generated.

(3) Problem Posed when Instance of Definition for Multiphase Type Function is Generated in Plurality of Relocatable Object Files A definition for a multiphase type function is requested to generate an instance each time the multiphase type function is used. Therefore, the instance of a definition for a multiphase type function is generated every generation request, thereby a plurality of equal definitions exist.

With respect to this, as illustrated in FIG. 11, when the instances of a plurality of definitions 322 and 323 for multiphase type functions are generated, the language processing system has a flag variable representing whether the definitions for the multiphase type functions are instantiated or not to make it possible to avoid a duplicate definition from being generated.

However, when the instances of definitions for multiphase type functions indicated by 324 in another unit of translation (shown in FIG. 11C), the conventional language processing system cannot decide whether the definitions for the specified multiphase type functions have been already generated in another unit of translation or not.

For this reason, the conventional technique uses a method in which a source programmer manually suppresses duplicate generation of the instance of a definition for a multiphase type function by using a special preprocessing directive or a method for deleting definitions for multiphase type functions whose links are duplicate in link processing are used. However, the former requests a source programmer to perform unnecessary limitation, and the latter requires a very long time for the decision process.

SUMMARY OF THE INVENTION

The present invention is made to solve the problems in the prior art described above.

It is an object of the present invention to optimize a multiphase type definition in a system for program language processing which can easily detect a definition for data or a function of a multiphase type and which can easily delete an unnecessary duplicate multiphase type definition from a source program to optimize the source program, and to provide a method therefor and a computer readable recording medium.

It is another object of the present invention to optimize a multiphase type definition in a system for program language processing which can avoid an unnecessary multiphase type from being instantiated, and to provide a method therefor and a computer readable recording medium.

According to an aspect of the present invention, there is provided a system for program language processing for translating source programs to generate an object program, comprising: a preprocessor for executing preprocessing of source programs inputted in translation units; a data type definition table, arranged for one object program, for registering a data type definition for data or a function in the source programs; a code optimizing processor for scanning all the preprocessed source programs to be used as a source for generating the object program, and deleting a duplicate data type definition from the source programs to optimize the source programs; a language processor for compiling the optimized source programs; and a software driver for controlling a transfer of a source program and a processing result of at least one of the preprocessor, the code optimizing processor, and the language processor.

The code optimizing processor may include: a data type definition detection unit for detecting a predetermined data type definition from the preprocessed source program; a first decision unit for deciding whether definition information of the detected data type definition is registered into the data type definition table or not; a first registration unit for registering the definition information of the data type definition into the data type definition table when it is decided by the first decision unit that the definition information of the data type definition does not have been registered; and a first deletion unit for deleting the data type definition detected by the data type definition detection unit from the preprocessed source program when it is decided by the first decision unit that the definition information of the data type definition has been registered.

The code optimizing processor may further include: an instantiation request detection unit for detecting an instantiation request of a data type definition from the preprocessed source program; a second decision unit for deciding, with reference to instantiation information in the data type definition table, whether the instance of a data type definition corresponding to the detected instantiation request of the data type definition has been generated or not; and an instance generation unit for generating the instance of the data type definition when it is decided by the second decision unit that the instance of the data type definition does not have been generated, for registering information representing the generation of the instance into the data type definition table as the instantiation information, and for suppressing generation of the instance of the data type definition when it is decided by the second decision unit that the instance of the data type definition has been generated.

The code optimizing processor may further include: a second deletion unit for deciding the presence/absence of usage of data type in the data type definition table and deleting a definition for a data type which is not used in all the source programs to be used as a source for generating the object program from the source programs.

The data type may be one of a multiphase type data, a multiphase type function, and a multiphase type holding member function.

The data type definition table may include at least instantiation information representing whether instantiation is requested in at least the source program for every symbol of each data type of the multiphase type.

The data type definition table may include member usage information representing, when the data type is a multiphase type holding member function, whether each member function is used or not, and the optimizing process or determines member function of a multiphase type the instance of which is to be actually generated in the source program with reference to the member usage information in the data type definition table.

The substance generation unit of the code optimizing processor may convert the name of the data definition into an unique name in one source program.

According to another aspect of the present invention, there is provided a method of program language processing for translating source programs to generate an object program, comprising the steps of: executing preprocessing of source program inputted in translation units; scanning all the preprocessed source programs to be used as a source for generating the object program; deleting a duplicate data type definition from the source program with reference to a data type definition table arranged for one object program, the table registering a data type definition for data or a function in the source program to optimize the source program; and compiling the optimized source program.

According to still another object of the present invention, there is provided a computer readable recording medium for causing a computer to execute program language processing for translating source program to generate an object program, comprising: a process for executing preprocessing of source program input in translation units; a process for scanning all the preprocessed source programs to be used as a source for generating the object program; a process for deleting a duplicate data type definition from the source programs with reference to a data type definition table arranged for one object program so as to suppress instantiation of a data type definition which has been instantiated as needed to optimize the source program, the table registering a data type definition for data or a function in the source program; and a process for compiling the optimized source program in units of translation.

According to still another object of the present invention, there is provided a program product for causing a computer to execute program language processing for translating source programs to generate an object program, comprising: a process for executing preprocessing of source program input in translation units; a process for scanning all the preprocessed source programs to be used as a source for generating the object program; a process for deleting a duplicate data type definition from the source program with reference to a data type definition table arranged for one object program so as to suppress instantiation of a data type definition which has been instantiated as needed to optimize the source program, the table registering a data type definition for data or a function in the source program; and a process for compiling the optimized source program in units of translation.

Various further and more specific objects, features and advantages of the invention will appear from the description given below, taken in connection with the accompanying drawings illustrating by way of example a preferred embodiments of the invention.

BRIEF DESCRIPTION OF DRAWINGS

FIG. 1 is a diagram showing a conventional exemplary definition for a multiphase type and a source program using the definition;

FIG. 2 is a diagram showing a definition for a multiphase type instantiated by an instantiation request in the source program in FIG. 1;

FIG. 3 is a diagram showing a definition for a multiphase type function in a conventional technique and a source program using the definition;

FIGS. 7A, 7B, and 7C are diagram showing an exemplary method of defining a multiphase type when a standard file configuration is used in a conventional technique;

FIGS. 8A and 8B are diagrams showing a conventional technique in which a definition for a multiphase type function is placed in a header file;

FIGS. 9A, 9B, and 9C are diagrams showing a conventional technique in which a definition for a multiphase type function is placed in a file having the same name as a multiphase type name;

FIG. 10 is a diagram showing a conventional technique in which an unnecessary instance of a definition for a multiphase type member function is generated;

FIGS. 11A, 11B, and 11C are diagrams showing an exemplary case in which the instances of definitions for multiphase type functions are duplicately generated in a plurality of relocatable object files in a conventional technique;

FIG. 16 is a diagram showing an example of generation of the instance of a multiphase type definition according to the first embodiment;

FIGS. 17A and 17B are diagrams for explaining an exemplary registration of a multiphase type function definition into a multiphase type definition table in a program language processing system according to the second embodiment of the present invention;

FIGS. 18A, 18B, and 18C are diagrams showing an example of generation of the instances of multiphase type function definitions according to the second embodiment;

FIGS. 19A and 19B are diagrams showing an exemplary registration of a multiphase type member function definition into a multiphase type definition table in a program language processing system according to the third embodiment of the present invention;

FIGS. 21A, 21B, and 21C are diagrams showing an example of generation of the instance of a multiphase type member function definition according to the third embodiment of the present invention.

DETAILED DESCRIPTION OF THE PREFERRED EMBODIMENTS

First Embodiment

A program language processing system according to the first embodiment of the present invention will be described below with reference to FIGS. 12 to 16.

The first embodiment provides a function of removing a duplicate data type definition for a multiphase type from a source file in a source program group for generating one object program and a function of avoiding the duplicate data type definition from being instantiated.

Figure 4:
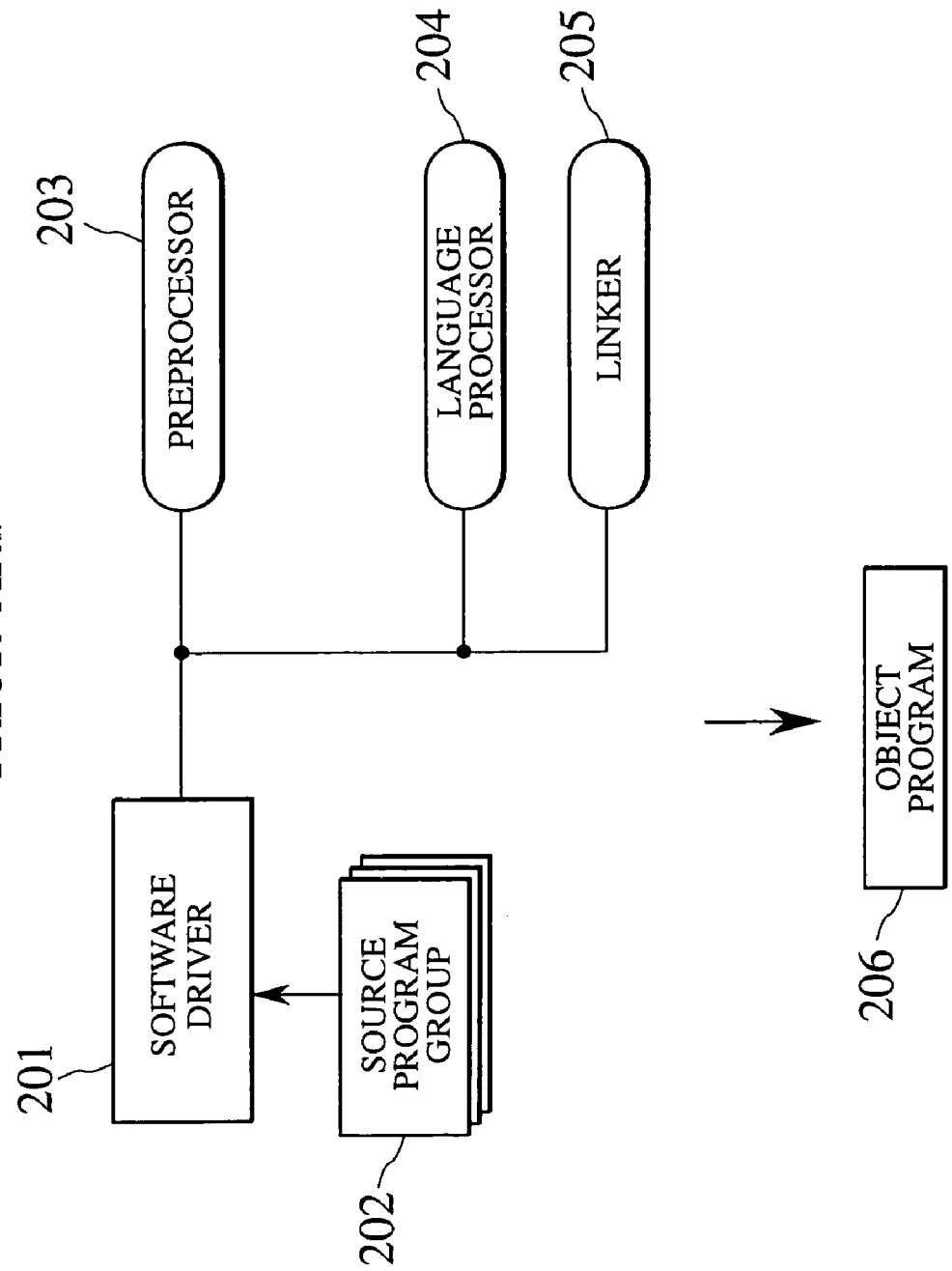
FIG. 4 is a block diagram showing the configuration of a program language processing system in a conventional technique.
Figure 5:
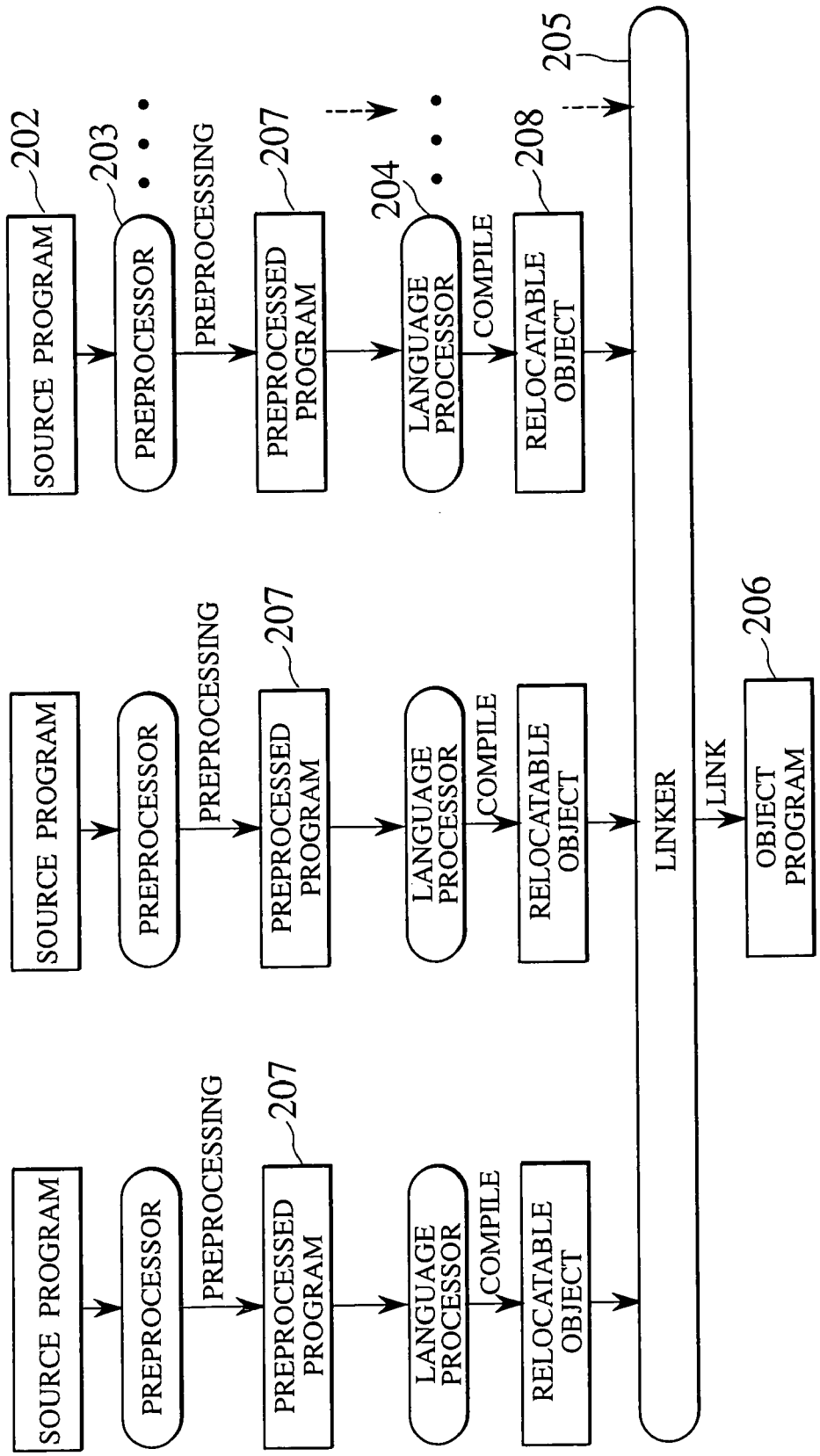
FIG. 5 is a concept diagram showing the flow of processes in the program language processing system in a conventional technique.
Figures 6A, 6B:
FIGS. 6A and 6B are diagrams showing exemplary instantiation of multiphase types in a conventional technique.
Figure 12:
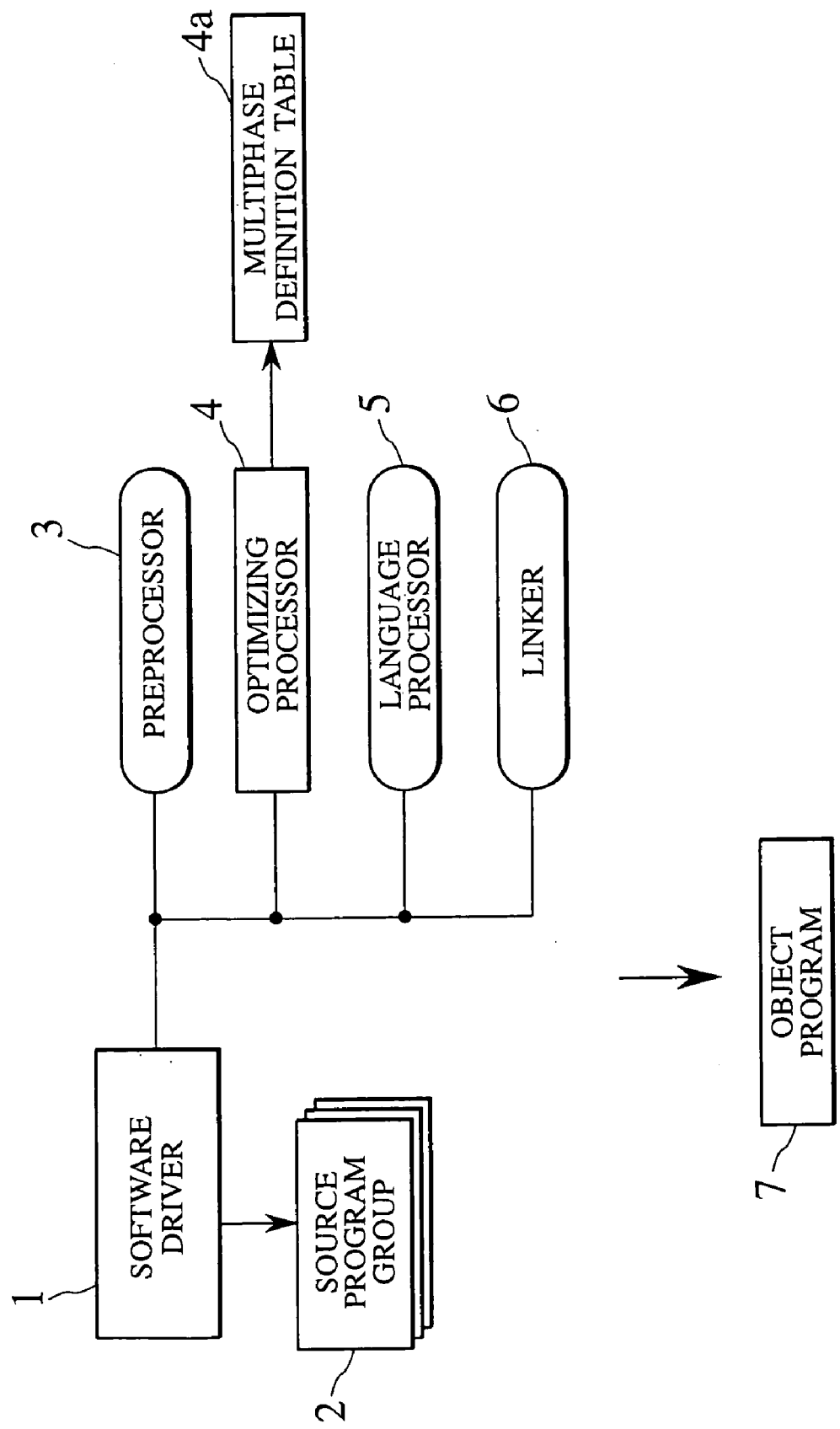
FIG. 12 is a block diagram showing the basic configuration of a program language processing system according to the first embodiment of the present invention.

FIG. 12 is a block diagram showing the basic configuration of a program language processing system according to the first embodiment of the present invention.

The program language processing system according to the first embodiment comprises a software driver 1, a preprocessor 3, an optimizing processor 4, a language processor (compiler) 5, and a linker 6 to generate an object program 7 from a source program group 2. Of these elements, the preprocessor 3, the language processor 5, and the linker 6 have the same functions as those of the preprocessor 203, the language processor 204, and the linker 205 in the conventional system shown in FIG. 1. Therefore, in the configuration of the program language processing system according to the first embodiment, the new optimizing processor 4 is arranged in the program language processing system having the conventional configuration in FIG. 1, and the software driver 1 obtained by expanding the function of the software driver 201.

More specifically, the program language processing system according to the first embodiment is a system for generating an object code for a CPU such as a compiler, and can handle a multiphase data type. The program language processing system according to the first embodiment has the software driver 1 which can be controlled such that all preprocessed input programs (source programs) can be given to the optimizing processor 4. The optimizing processor 4 forms one multiphase type definition tables 4a for all input programs and deletes an unnecessary code (definition) by using information stored in the tables 4a to realize the optimization of the code.

Next, the procedure of program language processing including code optimizing processing in the first embodiment will be described below.

Figure 13:
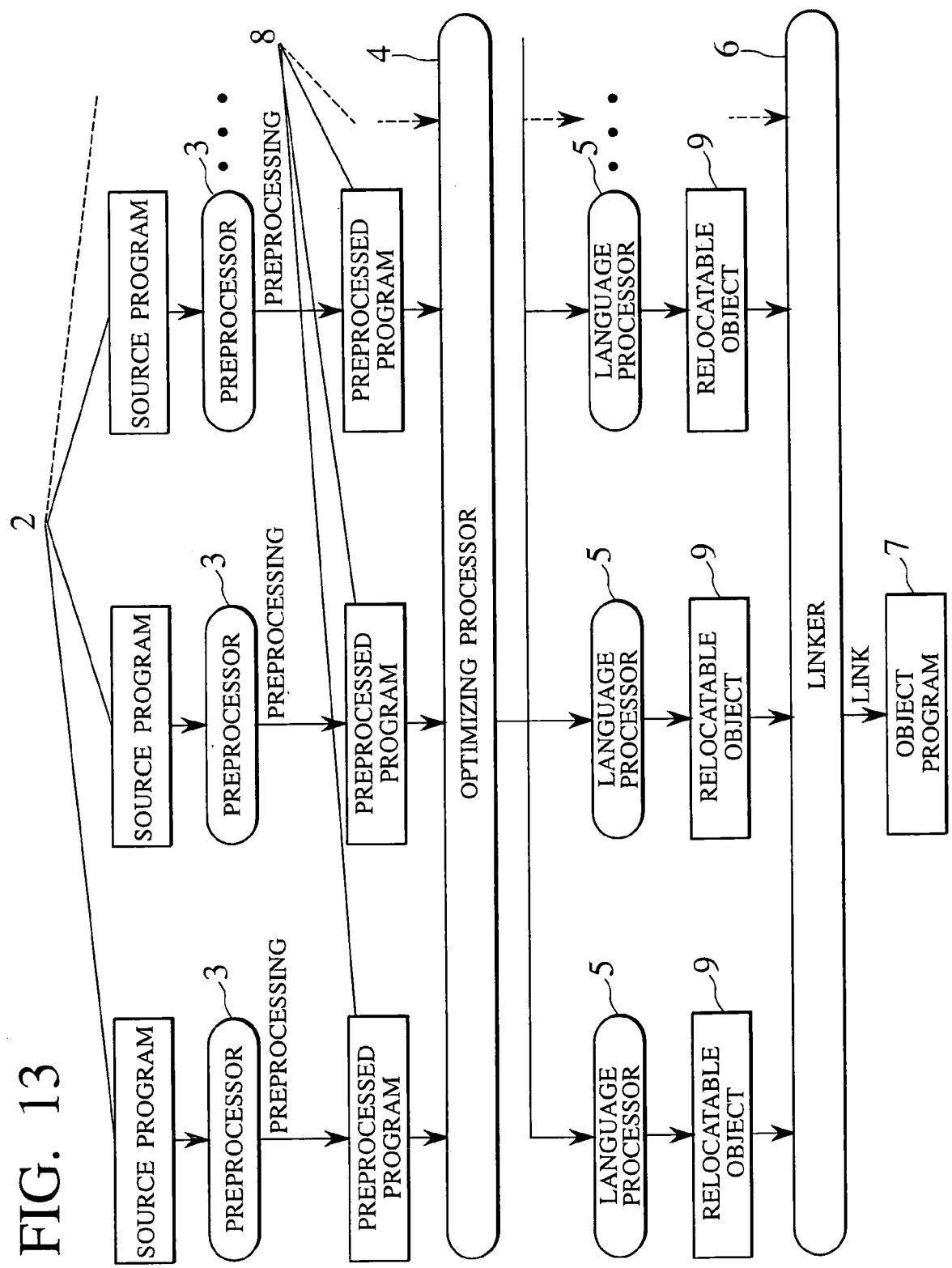
FIG. 13 is a concept diagram showing the flow of processes of object program generation processing in the program language processing system according to the first embodiment.

FIG. 13 is a concept diagram showing the flow of processes by the program language processing system according to the first embodiment.

The software driver 1 (shown in FIG. 12) performs control such that the input source program group 2 is sequentially given to the preprocessor 3, the optimizing processor 4, the language processor 5, and the linker 6.

When the source program group 2 is given to the preprocessor 3 by the software driver 1 in the unit of source file, a preprocessing command is executed by the preprocessor 3 to perform the same preprocessing (e.g., translation or the like) as that of a conventional language processing system. As a result, preprocessed source files 8 are output from the preprocessor 3 in units of translation. All the preprocessed files 8 are input to the optimizing processor 4. After code optimizing processing (to be described later) is completed for all the input files 8, respective translation units 5a, 5b, 5c, . . . , are distributed to the language processors 5 in parallel.

The software driver 1 performs control for reading all the files 8 into the optimizing processor 4 and control for distributing the optimized files 8 to the language processors 5. The function of the software driver 1 is an extended function obtained by expanding the function of the software driver 201 of the conventional system.

Subsequently, as in the conventional language processing system, relocatable objects 9 generated by the language processors 5 are linked by the linker 6 to obtain a target object program 7.

Figure 14:
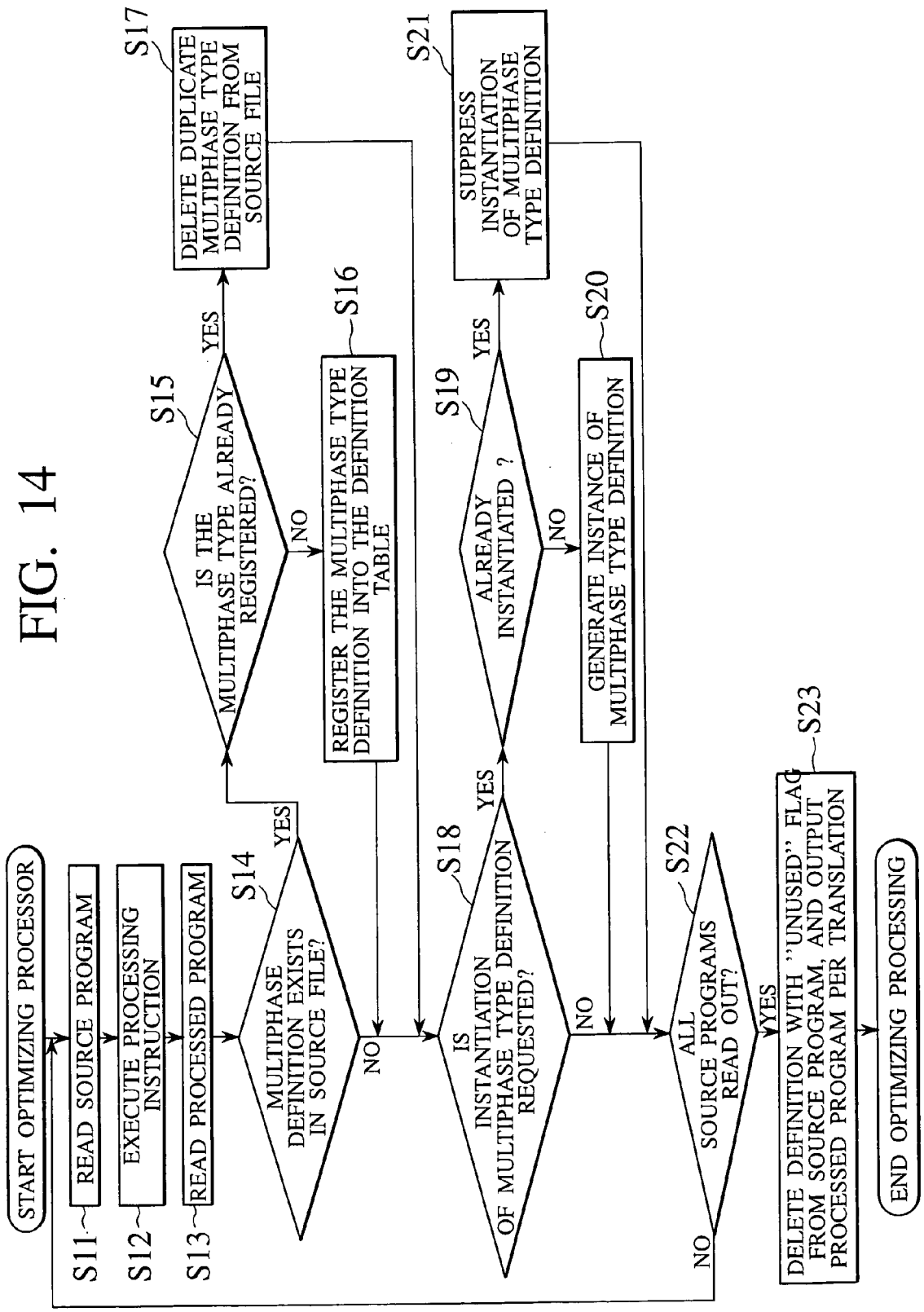
FIG. 14 is a flow chart showing a processing procedure of code optimizing processing according to the first embodiment of the present invention.
Figures 15A, 15B:
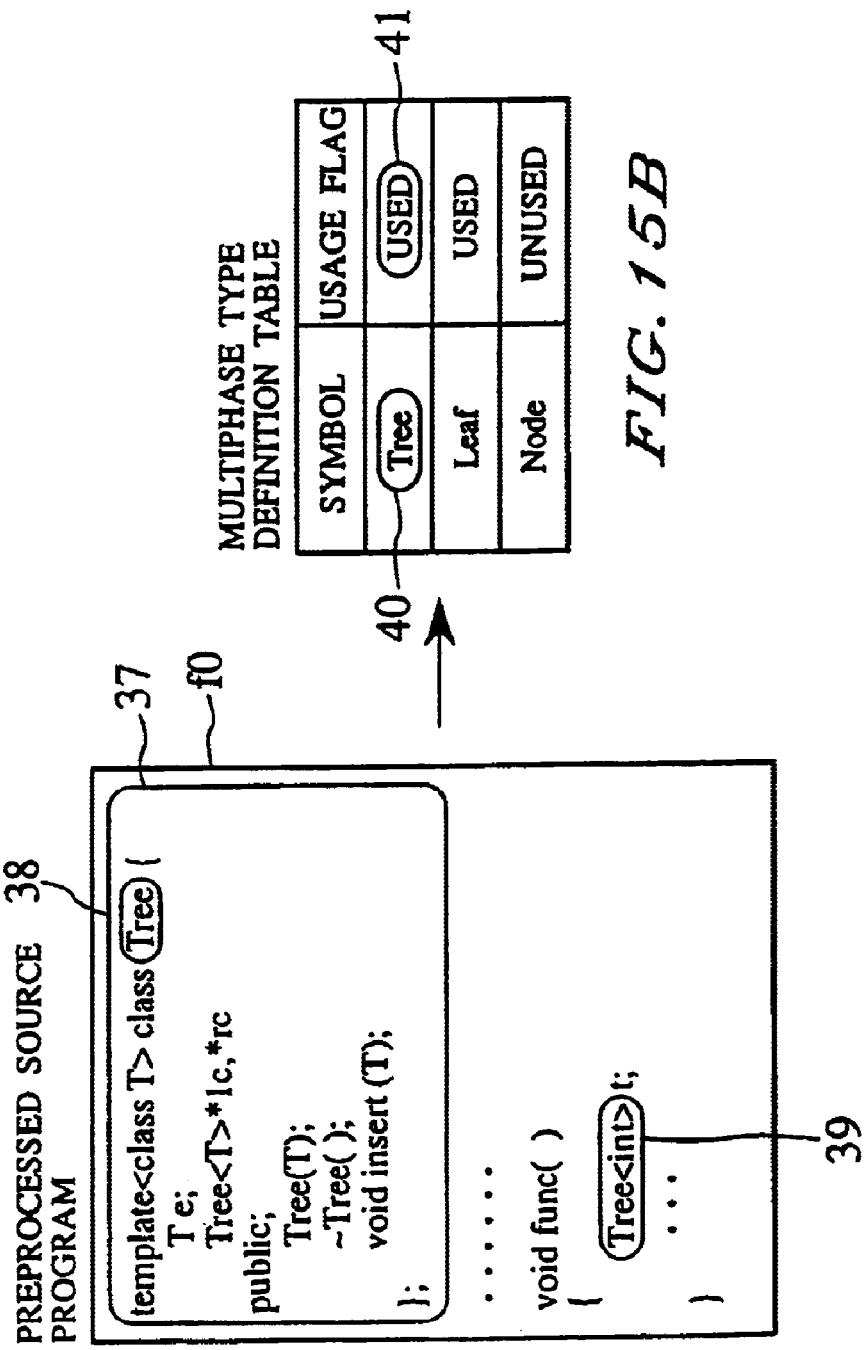
FIGS. 15A and 15B are diagrams showing an exemplary registration of a multiphase type definition into a multiphase type definition table according to the first embodiment.

Next, the details of the code optimizing processing in the first embodiment will be described below with reference to FIGS. 14 to 16. FIG. 14 is a flow chart showing code optimizing processing performed by the optimizing processor 4 according to the first embodiment. FIGS. 15A and 15B are diagrams showing a registration of a multiphase type definition into a multiphase type definition table 4a according to the first embodiment, and FIG. 16 is a diagram showing generation of the instance of a multiphase type definition according to the first embodiment.

As shown in FIG. 14, the software driver 1 reads the source program 2 to give the source program 2 to the preprocessor 3 (step S11), and the preprocessor 3 executes a preprocessing instruction to perform preprocessing (step S12). The software driver 1 reads a preprocessed program f0 (shown in FIG. 15A) to give the preprocessed program f0 to the optimizing processor 4 (step S13).

The optimizing processor 4 scans the preprocessed program f0 inputted at this time to execute optimization of a code according to the first embodiment, and searches for a multiphase type definition existing in the input program f0 (step S14). If the multiphase type definition does not exist in the source program f0 (NO in step S14), the processing shifts to the searching process for a multiphase type instance in step S18 (to be described later). On the other hand, if the multiphase type definition exists in the program f0 (YES in step S14), it is checked on the basis of the definition information in the multiphase type definition table 4a whether the multiphase type definition has been registered or not (step S15). If the multiphase type definition is a definition which has not been registered (NO in step S15), the definition information is registered into the multiphase type definition tables 4a (step S16).

In the registration processing to the multiphase type definition table 4a, a type name "Tree" 38 of the detected multiphase type definition is registered into the multiphase type definition table 4a as definition information (see 40 in FIG. 15B). At this time, it is checked whether the definition for the multiphase type "Tree" is used in the current program f0 or not. If the definition is used in the program f0 (see 39 in FIG. 15A), a usage flag for the multiphase type information in the multiphase type definition table 4a is set in a used status (see 41 in FIG. 15B).

On the other hand, if the definition is a multiphase type definition which has been already registered (YES in step S15), the definition is duplicate. Therefore, the optimizing processor 4 does not register the multiphase type information into the multiphase type definition information table 4a, and delete the duplicate multiphase type definition from the source program f0 (step S17). More specifically, when the type name "Tree" has been registered into the multiphase type definition table 4a, the multiphase type definition 37 which is detected at this time is considered as a duplicate definition, and the multiphase type definition 37 is deleted from the input program f0 which is read at this time.

Here, a usage flag in the multiphase type definition table 4a will be described below. This usage flag is set in a used status if the type name (symbol) is used in any of all the source files, and is set in an unused status if any source program does not use the type name. In execution of the code optimizing processing according to the first embodiment shown in FIG. 14, after all the source program are read in and scanned, and the usage flag of the type name registered in the multiphase type definition table 4a is checked. When it is found by checking the usage flag that a certain data type name (symbol) is not used in all the programs (that is, the usage flag is set in an unused status), the optimizing processor 4 regards the multiphase type definition as an unnecessary definition, and deletes the multiphase type definition from the input program (step S22 (to be described later)).

After the scanning of the multiphase type definition is completed by steps S14 to S17 described above, the optimizing processor 4 searches for the presence/absence of an instantiation request of a multiphase type definition using a multiphase type in the source program f0 (step S18). If the instantiation request of the multiphase type definition exists (YES in step S18), it is checked on the basis of entries in, e.g., the multiphase type definition table 4a whether the type of a multiphase type definition to be instantiated has existed (step S19). If the definition is a multiphase type definition has not been instantiated (NO in step S119), the instance of the multiphase type (definition) is generated (step S20). On the other hand, if the multiphase type definition has been already instantiated (YES in step S19), the instantiated definition is a duplicate, and therefore, the instance of the multiphase type is not generated (step S21).

Here, the details of the generation processing for the multiphase type instance in step S20 will be described with reference to FIGS. 16A and 16B. When the optimizing processor 4 detects a multiphase type instance generation request 45 (shown in FIG. 16A) using, e.g., an int type, the optimizing processor 4 inquires of the multiphase type definition table 4a (shown in FIG. 15B) whether the instance of the multiphase type definition has been generated or not. At this time, if the instance has not been generated, the optimizing processor 4 generates the instance of the multiphase type definition of an int type indicated by 43, and registers information (e.g., may be held in the multiphase type definition table 4a in FIG. 15B as an instantiation flag) representing that the instance has been generated into the multiphase type definition table 4a. In this case, the name of the multiphase type is converted into a unique name in the program, and all the type names of the multiphase type instance generation request 45 using the int type and the like are converted into a unique name as indicated by 48.

Similarly, when a multiphase type instance generation request 46 using a double type is detected, generation of the instance of a double-type multiphase type definition indicated by 44, instantiation information registration into the multiphase type definition table 4a, and conversion into unique names indicated by 49 and 50 are performed. Here, when an instance generation request of the second multiphase type definition using a double type is detected, information representing that "the instance of the double-type multiphase type definition has been generated" exists in the multiphase type definition table 4a. For this reason, the instance of the multiphase type definition using the double type as indicated by 44 is not generated again on the basis of the instantiation information.

Note that in generation of the instances of the multiphase type definitions, if an architecture handles the int type and the double type as the same types, the instances of both multiphase type definitions are regarded to be equal to each other, only one instance of the multiphase type definition is generated. As a result, an optimized source program f0' as shown in FIG. 16B is obtained.

Subsequently, the above processes (step S11 to step S21)are repeated for all the source programs (step S22), the definition of a type name (symbol) in which a usage flag is finally set OFF (unused) is deleted from all the source files. Thereafter, the processed programs are given to the language processor 5 by the software driver 1 (step S23).

According to the first embodiment, the following effect can be obtained. Since the optimizing processor 4 executes the above mentioned code optimizing processing to all the source programs, pieces of multiphase type definition information in all the source programs and pieces of instantiation request information can be collected in the multiphase type definition tables 4a arranged for target object program to be generated. In this manner, an unnecessary duplicate multiphase type definition can be deleted, and an unnecessary multiphase type instance can be avoided from being generated. For this reason, an object code size can be reduced, and an execution speed can be increased. In addition, since optimization is completed before compiling, a compile time and a link time required for a multiphase type can be shortened.

Second Embodiment

Next, only different points between a program language processing system according to the second embodiment of the present invention and the program language processing system of the first embodiment will be described below with reference to FIGS. 14, 17 and 18.

As to the second embodiment, registration into a multiphase type definition table and generation of an instance with respect to, especially, a multiphase type function definition in the configuration of the first embodiment is described below.

FIGS. 17A and 17B are diagrams for explaining an exemplary registration of a multiphase type function definition into a multiphase type definition table 4b according to the second embodiment.

When the optimizing processor 4 according to the second embodiment reads preprocessed source programs f1 and f2 (step S13 in FIG. 14) and detects a multiphase type function definition 51 (step S14 in FIG. 14), the optimizing processor 4 checks on the basis of definition information in the multiphase type definition table 4b whether the function definition 51 has been registered or not (step S15 in FIG. 14).

If the definition is a multiphase type function definition which has not been registered (NO in step S15), a type name "max" 52 of the detected multiphase type is registered in FIG. 14).

In addition, as is apparent from 53, 54, and 55 in FIG. 17A, when the multiphase type 51 is used, each time a multiphase type definition instance request is made, usage flags (each representing the presence/absence of the multiphase type definition instance request) of multiphase type definition information (indicated by 56 and 57) on the multiphase type definition table 4a are set in a used status (FIG. 17B).

When a multiphase type function name registered in the multiphase type definition table 4a is not used in all the programs, the optimizing processor 4 regards a definition for the multiphase type as an unnecessary definition and deletes the definition from the preprocessed source program (step S22 in FIG. 14).

FIGS. 18A, 18B, and 18C are diagrams showing generation of the instances of multiphase type function definitions according to the second embodiment.

The optimizing processor 4 reads the multiphase type function definition 51 as described with FIGS. 17A and 17B, and registers the multiphase type function definition 51 in the multiphase type definition table 4b. Thereafter, when the optimizing processor 4 detects an instance generation request 53 for a multiphase type function definition of an int type (step S18 in FIG. 14), the optimizing processor 4 inquires of the multiphase type definition table 4a whether the instance of the multiphase type function definition has been generated in the multiphase type definition table 4a or not (step S19 in FIG. 14).

If the instance of the multiphase type function definition has not been generated, the optimizing processor 4 generates the instance of a multiphase type function definition of an int type indicated by 62 (shown in FIG. 18C), and the instantiation information (e.g., as a usage flag) representing the instance has been generated is registered in the multiphase type definition table 4b. In this case, the name of the multiphase type function is converted into a unique name in a program, and all function names using the function and indicated by 64, 66, and the like are converted into the unique name.

Similarly, when an instance generation request 54 of a multiphase type function definition of a double type is detected, the instance of a multiphase type function definition of a double type indicated by 63 is generated (corresponding to step S20 in FIG. 14), registration of instantiation information representing that the instance has been generated into the multiphase type definition table 4a and conversion into a unique name as indicated by 65 are performed.

Here, an instance generation request of a multiphase type function definition of an int type indicated by 55 (shown in FIG. 18B) is detected, since information representing that the instance of a multiphase type function definition of an int type has been generated exists in the multiphase type definition table 4b, the instance of the multiphase type function definition of the int type as indicated by 62 is suppressed from being generated in a source program f2' (step S21 in FIG. 14).

In generation of the instances of the multiphase type definitions, if an architecture handles the int type and the double type as the same types, both instances of the multiphase type definitions are regarded to be equal to each other, only one instance of the multiphase type definition is generated.

As a result, optimized source program f1' and f2' as shown in FIG. 18C are obtained.

According to the second embodiment, in a multiphase type function definition, the same effect as that in the first embodiment can be obtained.

Third Embodiment

Next, a program language processing system according to the third embodiment of the present invention will be described in detail with reference to FIG. 14 and FIGS. 19 to 21.

In the third embodiment, in the configuration of the first embodiment, with respect to, especially, a multiphase type member function definition, registration into a multiphase type definition table and instance generation is described.

Figure 20:
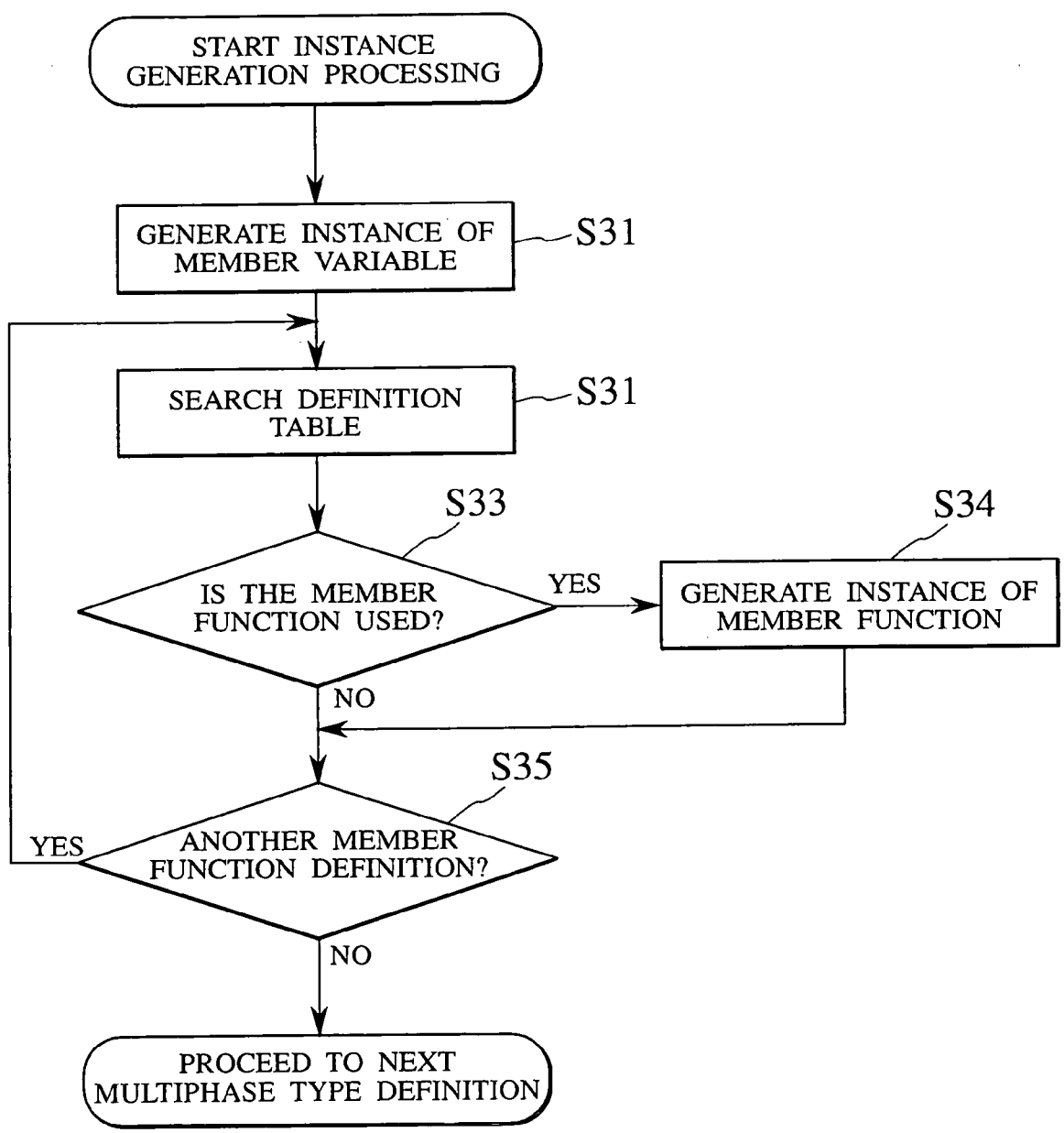
FIG. 20 is a flow chart showing a processing procedure of optimizing processing of a multiphase type member function according to the third embodiment.
Figure 22:
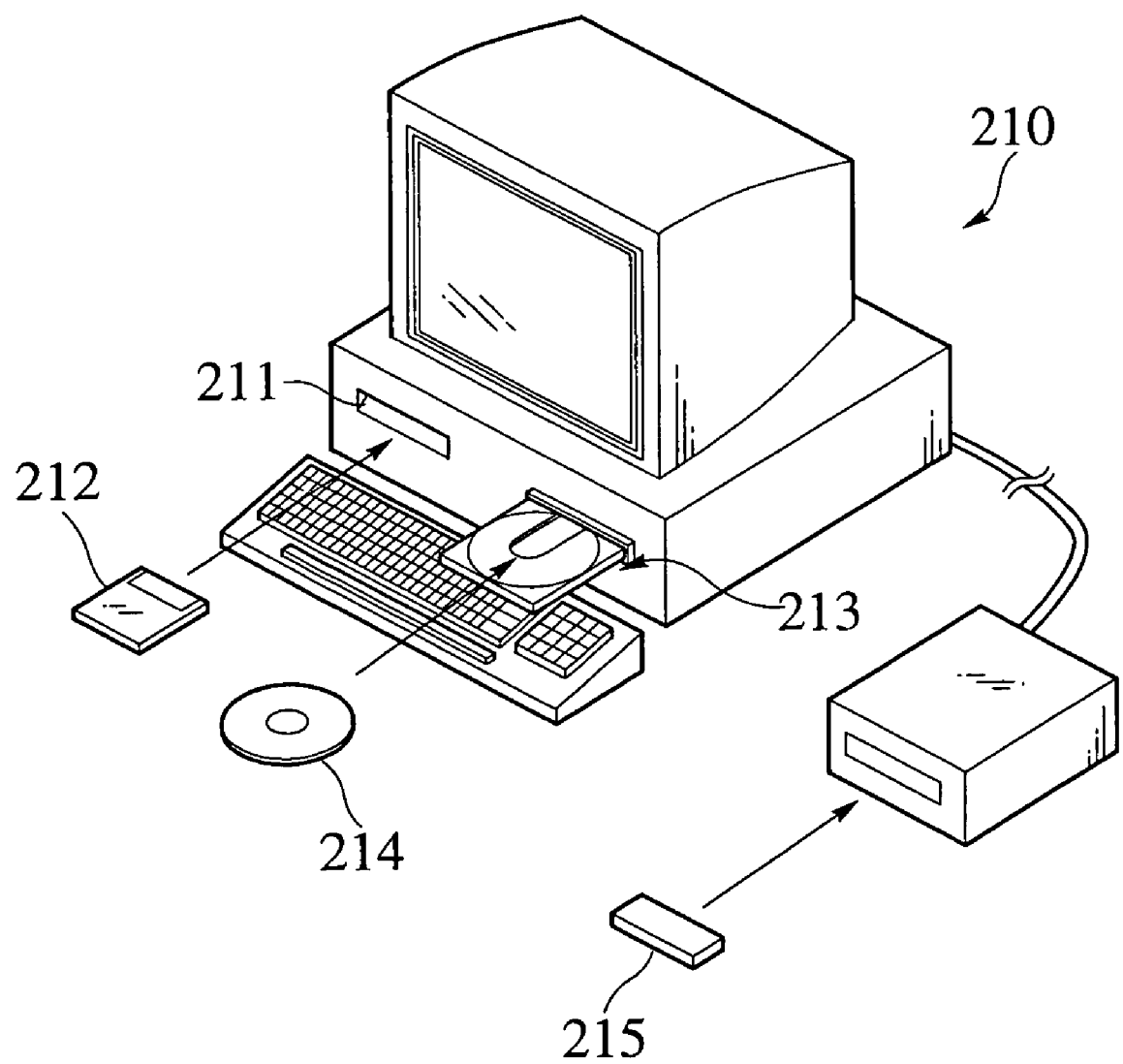
FIG. 22 is an illustration showing a hardware configuration for code optimizing processing and a program language processing according to the embodiments of the present invention.

FIGS. 19A and 19B are diagrams showing a registration of a multiphase type member function definition into a multiphase type definition table 4c according to the third embodiment of the present invention. FIG. 20 is a flow chart showing a procedure of optimizing processing of a multiphase type member function according to the third embodiment. This processing is executed in generation processing for a multiphase type instance (definition) in step S20 in FIG. 14.

The optimizing processor 4 reads a preprocessed source program f3 shown in FIG. 19A (step S13 in FIG. 14) and detects a multiphase type definition 66 (step S14 in FIG. 14). At this time, when the multiphase type has a member function 67, the optimizing processor 4 simultaneously detects pieces of information representing whether the multiphase type member function indicated by 67 is used as indicated by 68 and 69 (step S15), registers pieces of multiphase type member function usage information in the multiphase type definition table 4c as indicated by 70 and 71 (step S16 in FIG. 14), and sets a member function usage flag in a used status as indicated by 72.

Thereafter, the optimizing processor 4 detects a multiphase type instance generation request 76 (step S18 in FIG. 14), and the optimizing processor 4 inquires of the multiphase type definition table 4c. If the instance of the multiphase type definitions has not been generated (NO in step S19 in FIG. 14), the instance (definition) of the multiphase type definition is generated (step S20).

In the generation of the instance (definition) of the multiphase type, the optimizing processor 4 performs the processes shown in the flow chart of FIG. 20. In FIG. 20, member variable definitions required in all the multiphase type member functions are instantiated (step S31).

If the multiphase type has a member function, the optimizing processor 4 inquires of the multiphase type definition table 4c whether the member function is used (step S32 and step S33). If the member function is used (YES in step S33), the instance of the multiphase type member function definition is generated (step S34). On the other hand, if the member function is not used (NO in step S33), the instance of the multiphase type member function definition is not generated.

The processing performed in steps S31 to S34 is executed to all the multiphase type member functions (step S35). In this manner, in the third embodiment, the instance of the multiphase type member function definition which is not used can be avoided from being generated.

FIGS. 21A, 21B, and 21C are diagrams showing generation of the instance of a multiphase type member function definition according to the third embodiment.

When the optimizing processor 4 detects, e.g., the multiphase type instance generation request 76 of the int type (FIG. 21A), the optimizing processor 4 inquires of the multiphase type definition table 4c. If the instance of the multiphase type definition has not been generated, the multiphase type member function which is to be actually generated is determined on the basis of usage information (member function usage flag).

In the example shown in FIGS. 21A, 21B, and 21C, since two multiphase type member function definitions 74 are used in the instance of the int type, a member function whose instance is generated for an int-type multiphase type definition 78 is as indicated by 79, and the instance of other multiphase type member function definitions which are not used are not generated.

Similarly, when a double-type multiphase type instance generation request 77 is detected, if the instance of the multiphase type definition has not been generated, it is determined referring to the multiphase type definition table 4c on the basis of usage information of the multiphase type member function that the multiphase type member function 75 actually generated is only one member function. According to this determination, a member function whose instance is to be actually generated for a double-type multiphase type definition 80 is only one member function indicated by 81.

As a result, an optimized source program f3' as shown in FIG. 21C is obtained.

According to the third embodiment, in a multiphase type member function definition, the same effect as that in the first embodiment can be obtained.

In each of the embodiments described above, a multiphase type is exemplified. However, by using the configuration shown in FIGS. 12 and 13, not limited to a multiphase type, duplicate data and duplicate functions in a source program group can be deleted.

In this case, as in the multiphase type, the optimizing processor 4 also reads a preprocessed source program and registers data and function definitions into the definition table 4a. At this time, when the optimizing processor 4 detects the data and the functions which is already registered in the information of the definition table 4a, the optimizing processor 4 regards the definitions for the data and the functions as duplicate definitions and deletes the duplicate definitions from the preprocessed program. If the data and the functions not used in all the programs in the definition are detected among the data and the functions registered in the definition table 4a, the optimizing processor 4 regards the definition as an unnecessary definition and deletes the definition from the preprocessed source program.

Referring to FIG. 21, a hardware configuration in the above embodiment will be described below. A program language processing system according to the above embodiment is performed by using a computer system which loads a program for realizing the functions to make it possible to execute above mentioned processing. This computer system includes a so-called general-purpose computer, a workstation, a PC, an NC (Network Computer), or the like. The hardware of the computer system using the above embodiment comprises a CPU for performing various processing, memories such as a program memory or a data memory, external storage devices such as an FD 215, a CD 214, and a memory card 215, device drivers 211 and 213 for driving the external storage devices, input devices such as a keyboard or a mouse, and output devices such as a display or a printer.

A program for realizing the program language processing and code optimizing processing can be stored in various recording medium. The recording medium is loaded into the computer system comprising the hardware to execute a program recorded on the recording medium, so that the present invention can be performed. Here, the recording medium includes, in addition to an external storage device 603, a general device such as a memory card 25, a magnetic disk 22, or an optical disk 24 which can record a program.

In summary, according to the present invention, with respect to data or functions of any data type, a code related to an unnecessary definition can be deleted, and only a necessary definition can be instantiated. For this reason, a generated code size can be reduced, and an execution speed increases. In addition, since code optimizing processing is completed before compiling, a compile time and a link time required for a multiphase type can be shortened.

When these definitions are for multiphase type definitions, an unnecessary duplicate multiphase type definition can be deleted, and an unnecessary multiphase type can be avoided from being instantiated.

Furthermore, when these definitions are multiphase type function definitions, the multiphase type function definitions can be easily detected, an unnecessary duplicate multiphase type function definition can be deleted, and an unnecessary multiphase type function can be avoided from being instantiated.

When these definitions are member function definitions, an unnecessary duplicate multiphase type member function definition can be deleted, and an unnecessary multiphase type member function can be avoided from being instantiated.

Various modifications will become possible for those skilled in the art after receiving the teachings of the present disclosure without departing from the scope thereof. It is intended, therefore, that all matter contained in the foregoing description and in the drawings shall be interpreted as illustrative only not as limitative of the invention.

What is claimed is:

1. A system for program language processing for translating source programs to generate an object program, comprising:

a preprocessor configured to execute preprocessing of source programs inputted in translation units;

a data type definition table, arranged for one object program, configured to store a set of names of data type definition for data or a function in the source program and a use flag;

a data type definition detector configured to detect a predetermined data type definition declared in the preprocessed source program;

a first table updating module configured to, if a name of the detected data type definition is not registered, register the name of the detected data type definition into the data type definition table;

a first source updating module configured to, if the name of the detected data type definition is registered, delete the data type definition from all source programs that are succeedingly compiled and linked to one object program;

a second table updating module configured to, if the data type definition is described in a body of any of the source programs to be linked into the one object program, set the use flag to a use status;

a second source updating module configured to delete the data type definition of which the use flag is not set to the use status from all the source programs that are succeedingly compiled and linked to one object program to optimize the source programs;

a language processor configured to compile the optimized source programs; and a software driver configured to control a transfer of a source program and a processing result of at least one of the preprocessor, a code optimizing processor, and the language processor.

2. The system according to claim 1, further comprising:

an instantiation request detector configured to detect an instantiation request of a data type definition in the preprocessed source program;

a third table updating module configured to, if instantiation information arranged for each data type of a multiphase data type is not registered, register the instantiation information into the data type definition table, the multiphase data type employing a template model for a various data types to be instantiated; and a third source updating module configured, if the instantiation information of the data type of which instantiation is requested is not registered, not to generate any instance of the data type definition in the source program.

3. The system according to claim 2, wherein the data type definition table includes member usage information representing, when the data type is the multiphase type that contains a member function, whether each member function is used or not, and the third source updating module determines a member function of the multiphase type the instance of which is to be generated in the source program with reference to the member usage information in the data type definition table.

4. The system according to claim 2, wherein the third source updating module converts the name of the data definition into a unique name in a source program.

5. A method of program language processing for translating source programs to generate an object program, comprising:

executing preprocessing of source program inputted in translation units;

generating a data type definition table, arranged for one object program, for storing a set of names of data type definition for data or a function in the source program and a use flag;

detecting a predetermined data type definition declared in the preprocessed source program;

registering, if a name of the detected data type definition is not registered, the name of the detected data type definition into the data type definition table;

deleting, if the name of the detected data type definition is registered, the data type definition from all source programs that are succeedingly compiled and linked to one object program;

setting, if the data type definition is described in a body of any of the source programs to be linked into the one object program, the use flag to a use status;

deleting the data type definition of which the use flag is not set to the use status from all the source programs that are succeedingly compiled and linked to one object program to optimize the source programs; and compiling the optimized source program.

6. The method according to claim 5, further comprising:

detecting an instantiation request of a data type definition in the preprocessed source program;

registering, if instantiation information arranged for each data type of a multiphase data type is not registered, the instantiation information into the data type definition table, the multiphase data type employing a template model for various data types to be instantiated; and generating, if the instantiation information of the data type of which instantiation is requested is not registered, no instance of the data type definition in the source program.

7. The method according to claim 6, wherein the data type definition table includes member usage information representing, when the data type is the multiphase data type holding member function, whether each member function is used or not, and the generating step determines member functions of the multiphase data type the instance of which must be actually generated in the source program with reference to the member usage information in the data type definition table.

8. A computer readable recording medium for causing a computer to execute program language processing for translating a source program to generate an object program, comprising:

a process for executing preprocessing of source program input in translation units;

a process for generating a data type definition table, arranged for one object program, for storing a set of names of data type definition for data or a function in the source program and a use flag;

a process for detecting a predetermined data type definition declared in the preprocessed source program;

a process for registering, if a name of the detected data type definition is not registered, the name of the detected data type definition into the data type definition table;

a process for deleting, if the name of the detected data type definition is registered, the data type definition from all source programs that are succeedingly compiled and linked to one object program;

a process for setting, if the data type definition is described in a body of any of the source programs to be linked into the one object program, the use flag to a use status;

a process for deleting the data type definition of which the use flag is not set to the use status from all the source programs that are succeedingly compiled and linked to one object program to optimize the source programs; and a process for compiling the optimized source program.

9. The medium according to claim 8, further comprising:
a process for detecting an instantiation request of a data type definition in the preprocessed source program;
a process for registering, if instantiation information arranged for each data type of a multiphase data type is not registered, the instantiation information into the data type definition table, the multiphase data type employing a template model for various data types to be instantiated; and
a process for generating, if the instantiation information of the data type of which instantiation is requested is not registered, no instance of the data type definition in the source program.

10. A program stored on a computer-readable medium for causing a computer to execute program language processing for translating source programs to generate an object program, comprising:
a process for executing preprocessing of source programs input in translation units;
a process for generating a data type definition table, arranged for one object program, for storing a set of names of data type definition for data or a function in the source program and a use flag;
a process for detecting a predetermined data type definition declared in the preprocessed source program;
a process for registering, if a name of the detected data type definition is not registered, the name of the detected data type definition into the data type definition table;
a process for deleting, if the name of the detected data type definition is registered, the data type definition from all source programs that are succeedingly compiled and linked to one object program;
a process for setting, if the data type definition is described in a body of any of the source programs to be linked into the one object program, the use flag to a use status;
a process for deleting the data type definition of which the use flag is not set to the use status from all the source programs that are succeedingly compiled and linked to one object program to optimize the source programs; and
a process for compiling the optimized source program in units of translation.

11. A system for program language processing for translating source programs to generate an object program, comprising:
a preprocessor for executing preprocessing of source programs inputted in translation units;
a multiphase data type definition table, arranged for one object program, for storing a set of names of multiphase data type definition for data or a function in the source program and a use flag, the multiphase data type employing a template model for various data types to be instantiated;
a data type definition detector configured to detect the multiphase data type definition declared in the preprocessed source program;
a first table updating module configured to, if a name of the detected data type definition is not registered, register the name of the detected data type definition into the multiphase data type definition table;
a first source updating module configured to, if the name of the detected data type definition is registered, delete the multiphase data type definition from all source programs that are succeedingly compiled and linked to one object program;
a second table updating module configured to, if the multiphase data type definition is described in a body of any of the source programs to be linked into the one object program, set the use flag to a use status;
a second source updating module configured to delete the multiphase data type definition of which the use flag is not set to the use status from all the source programs that are succeedingly compiled and linked to one object program to optimize the source programs;
a third table updating module configured to, if instantiation information arranged for each data type of a multiphase data type is not registered, register the instantiation information into the data type definition table, the multiphase data type employing a template model for various data types to be instantiated;
a third source updating module configured, if the instantiation information of the data type of which instantiation is requested is not registered, not to generate any instance of the data type definition in all the source programs that are succeedingly compiled and linked to one object program;
a language processor for compiling the optimized source programs; and
a software driver for controlling a transfer of a source program and a processing result of at least one of the preprocessor, a code optimizing processor, and the language processor.

12. A method of program language processing for translating source programs to generate an object program, comprising:
executing preprocessing of source programs inputted in translation units;
generating a multiphase data type definition table, arranged for one object program, for storing a set of names of multiphase data type definition for data or a function in the source program and a use flag, the multiphase data type employing a template model for various data types to be instantiated;
detecting the multiphase data type definition declared in the preprocessed source program;
registering, if a name of the detected data type definition is not registered, the name of the detected data type definition into the multiphase data type definition table;
deleting, if the name of the detected data type definition is registered, the multiphase data type definition from all source programs that are succeedingly compiled and linked to one object program;
setting, if the multiphase data type definition is described in a body of any of the source programs to be linked into the one object program, the use flag to a use status;
deleting the multiphase data type definition of which the use flag is not set to the use status from all the source programs that are succeedingly compiled and linked to one object program to optimize the source programs;
registering, if instantiation information arranged for each data type of a multiphase data type is not registered, the instantiation information into the data type definition table, the multiphase data type employing a template model for various data types to be instantiated;

generating, if the instantiation information of the data type of which instantiation is requested is not registered, no instance of the data type definition in all the source programs that are succeedingly compiled and linked to one object program; and compiling the optimized source programs.

13. A computer readable recording medium for causing a computer to execute program language processing for translating source programs to generate an object program, comprising:

a process for executing preprocessing of source programs inputted in translation units;

a process for generating a multiphase data type definition table, arranged for one object program, for storing a set of names of multiphase data type definition for data or a function in the source program and a use flag, the multiphase data type employing a template model for various data types to be instantiated;

a process for detecting the multiphase data type definition declared in the preprocessed source program;

a process for registering, if a name of the detected data type definition is not registered, the name of the detected data type definition into the multiphase data type definition table;

a process for deleting, if the name of the detected data type definition is registered, the multiphase data type definition from all source programs that are succeedingly compiled and linked to one object program;

a process for setting, if the multiphase data type definition is described in a body of any of the source programs to be linked into the one object program, the use flag to a use status;

deleting the multiphase data type definition of which the use flag is not set to the use status from all the source programs that are succeedingly compiled and linked to one object program to optimize the source programs;

registering, if instantiation information arranged for each data type of a multiphase data type is not registered, the instantiation information into the data type definition table, the multiphase data type employing a template model for various data types to be instantiated;

generating, if the instantiation information of the data type of which instantiation is requested is not registered, no instance of the data type definition in the source program; and a process for compiling the optimized source programs.

14. A program product for causing a computer to execute program language processing for translating source programs to generate an object program, comprising:

a process for executing preprocessing of source programs inputted in translation units;

a process for generating a multiphase data type definition table, arranged for one object program, for storing a set of names of multiphase data type definition for data or a function in the source program and a use flag, the multiphase data type employing a template model for various data types to be instantiated;

a process for detecting the multiphase data type definition declared in the preprocessed source program;

a process for registering, if a name of the detected data type definition is not registered, the name of the detected data type definition into the multiphase data type definition table;

a process for deleting, if the name of the detected data type definition is registered, the multiphase data type definition from all source programs that are succeedingly compiled and linked to one object program;

a process for setting, if the multiphase data type definition is described in a body of any of the source programs to be linked into the one object program, the use flag to a use status;

deleting the multiphase data type definition of which the use flag is not set to the use status from all the source programs that are succeedingly compiled and linked to one object program to optimize the source programs;

registering, if instantiation information arranged for each data type of a multiphase data type is not registered, the instantiation information into the data type definition table, the multiphase data type employing a template model for various data types to be instantiated;

generating, if the instantiation information of the data type of which instantiation is requested is not registered, generate no instance of the data type definition in all the source programs that are succeedingly compiled and linked to one object program; and a process for compiling the optimized source programs.

* * * * *